Aug. 8, 1950 W. T. HARRELL 2,517,873
CIRCULAR SAW SHARPENING MACHINE
Filed Jan. 5, 1948 3 Sheets-Sheet 1

Inventor
William T. Harrell, Deceased
Ruth V. Harrell,
Administratrix Of The Estate By Clarence A. O'Brien
and Harvey B. Jacobson
Attorneys Aug. 8, 1950     W. T. HARRELL     2,517,873
CIRCULAR SAW SHARPENING MACHINE
Filed Jan. 5, 1948     3 Sheets-Sheet 2
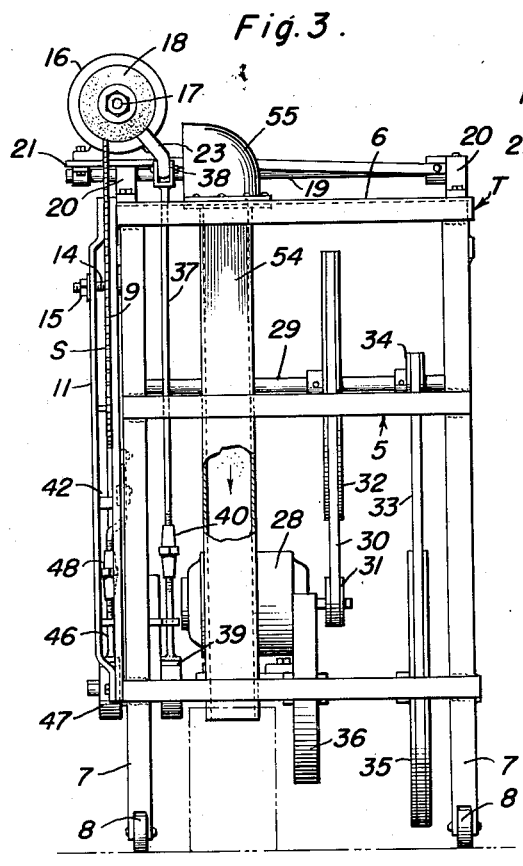
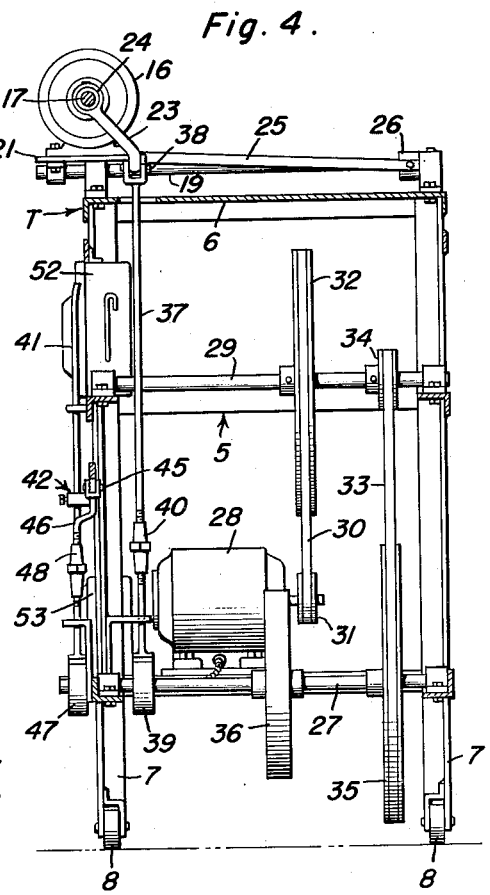
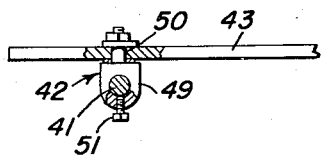
Inventor
William T. Harrell, Deceased
Ruth V. Harrell,
Administratrix Of The Estate
By Clarence A. O'Brien
and Harvey B. Jacobson
Attorneys Aug. 8, 1950     W. T. HARRELL     2,517,873
CIRCULAR SAW SHARPENING MACHINE Filed Jan. 5, 1948     3 Sheets-Sheet 3

Inventor
William T. Harrell, Deceased
Ruth V. Harrell,
   Administratrix Of The Estate By *Clarence A. O'Brien*
and *Harvey B. Jacobson*
                Attorneys Patented Aug. 8, 1950

2,517,873

UNITED STATES PATENT OFFICE 2,517,873

CIRCULAR SAW SHARPENING MACHINE

William T. Harrell, deceased, late of High Point, N. C., by Ruth V. Harrell, administratrix, High Point, N. C.

Application January 5, 1948, Serial No. 518

4 Claims. (Cl. 76—40)

This invention relates to improvements in circular saw sharpening machines, and the primary object of the invention is to provide a very simple and efficient machine which is adapted to rapidly and accurately grind circular saws to sharpen the same.

Another object of the invention is to provide a machine of the above kind which embodies a novel and practical combination and arrangement of parts and devices which afford a very practical machine organization which is easy and convenient to use and control.

The exact nature of the present invention, as well as other objects and features thereof, will become apparent from the following description when considered in connection with the accompanying drawings, in which:

Figure 3 is a side elevational view looking toward the left of Figure 1, partly broken away and in section;

Figure 4 is a vertical section taken substantially on line 4—4 of Figure 1;

Figure 8 is a fragmentary detail view, partly broken away and in section, showing the pivotal mounting of the saw advancing pawl.

Figure 1:
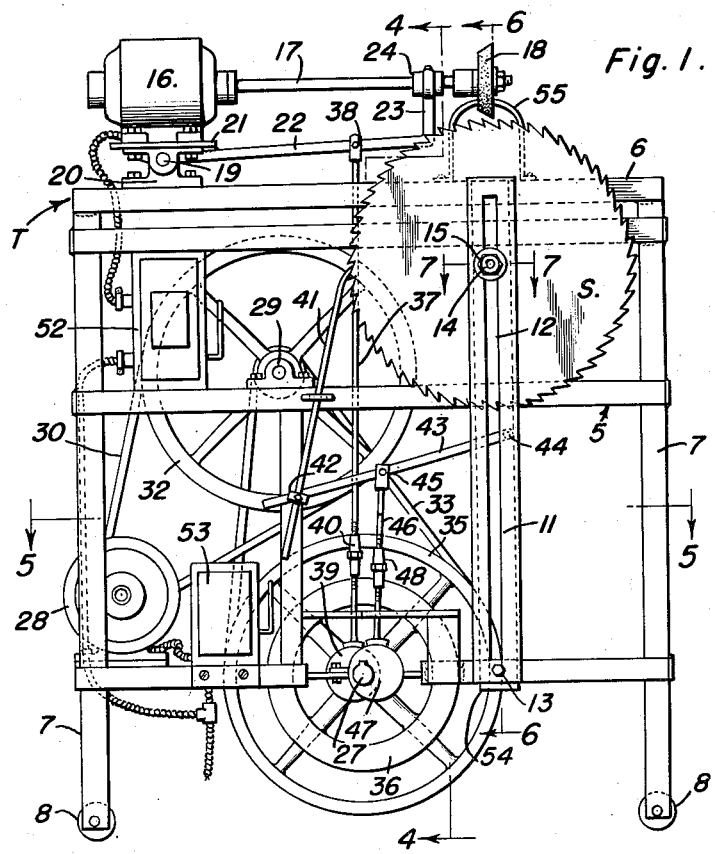
Figure 1 is a front elevational view of a circular saw sharpening machine constructed in accordance with the present invention.
Figure 2:
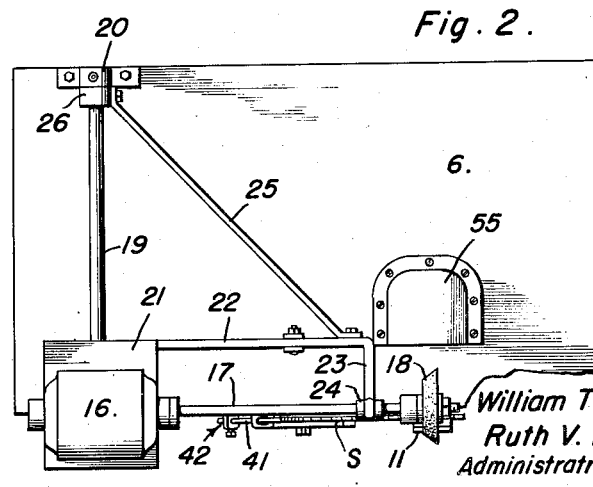
Figure 2 is a top plan view thereof.
Figure 5:
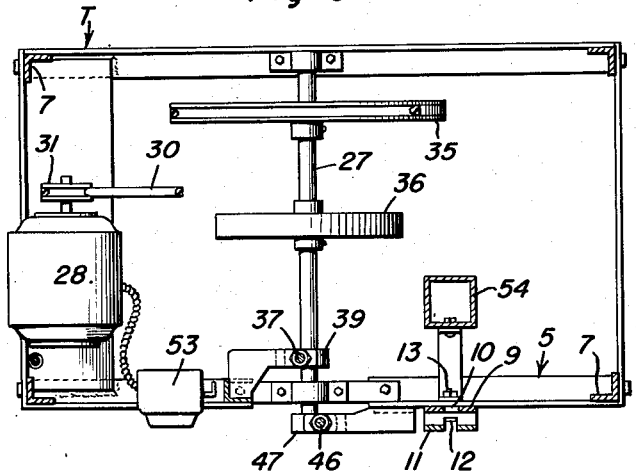
Figure 5 is a horizontal section taken substantially on line 5—5 of Figure 1.

Referring in detail to the drawings, the present machine includes a suitable table T composed of a frame 5 and a table top 6, said frame including corner supporting legs 7 having wheels 8 at their lower ends to facilitate movement of the machine from one place to another.

Means is provided for removably rotatably mounting a circular saw S on and parallel with the front of the table T so as to project above the top 6 of the latter. This means includes a vertical bar 9 rigidly secured on the front of the table near one side of the latter and provided with a central longitudinal elongated slot 10, a similar bar 11 disposed in front of and parallel with the bar 9 and having a longitudinal elongated slot 12. The lower end of bar 11 is rearwardly offset and bolted with the lower end of bar 9 to the frame 5 as at 13. A pivot and clamping bolt 14 extends through the slots 10 and 12 and has the saw S removably rotatably disposed thereon. The upper end of bar 11 is lightly frictionally engaged with the saw to prevent lateral flexing and vibration of the latter, by adjustment of a nut 15 threaded on the pivot bolt 14. It will be noted that the bars 9 and 11, pivot bolt 14 and nut 15 provide a clamp and journal for the saw, and in practice the adjustment of the nut 15 is such that forcible turning of the saw is permitted while the same is braced against undue lateral vibration. It will be seen that vertical adjustment of the pivot bolt 14 in the slots 10 and 12 provides for adapting the machine to saws of different diameters.

The machine also includes a grinder composed of an electric motor 16 having an elongated rotary power shaft 17, and a grinding wheel 18 secured on the outer end of said power shaft. Means is provided which rockably mounts the grinder on the top and at the front of the table. The latter means includes a shaft 19 having its ends secured in brackets 20 fastened upon the table top 6 near one end and at the front and back of the latter. Pivoted on the front end of shaft 19 is a platform 21 on which the motor 16 is fastened. An arm 22 is fixed to the platform 21 and has a lateral free end portion 23 provided with a bearing 24 in which the power shaft 17 is journaled adjacent the grinding wheel 18. The arm 22 is braced by a diagonal brace bar 25 attached at one end to the arm 22 and at its other end to a collar 26 rotatable on the shaft 19 adjacent the rear bracket 20.

A driven shaft 27 is horizontally journaled on and below the top of the table at a point below the saw and so as to extend from front to rear of said table. This shaft is driven by an electric motor 28 mounted in the frame adjacent said shaft and operatively connected to the latter through a speed reduction gearing. As shown, the speed reduction gearing includes a countershaft 29 journaled in the frame beneath the table top and above shaft 27, a power transmission belt 30 passing around pulleys 31 and 32 respectively secured on the power shaft of motor 28 and on the shaft 29, and a power transmission belt 33 passing around other pulleys 34 and 35 respectively secured on the shaft 29 and on the shaft 27. As the pulleys 31 and 34 are relatively small, and as the pulleys 32 and 35 are relatively large, the desired speed reduction is obtained for shaft 27. For the usual well known purpose, shaft 27 is provided with a balance or flywheel 36.

Means operatively connects the shaft 27 to the grinder for intermittently rocking the latter to alternatively move the grinding wheel 18 downwardly into and upwardly out of engagement with a tooth of the saw. For this purpose, a push rod 37 is vertically slidable through the top of the table and pivotally connected at its upper end as at 38 to the arm 22, the lower end of rod 37 bearing against a cam 39 secured on shaft 27. As indicated generally at 40, the rod 37 is adjustable in length so as to properly set the grinding wheel 18 with respect to saws of different diameters.

Saw advancing means is provided including a pawl 41 operatively connected to the shaft 27 and engageable with a tooth of the saw for automatically turning and thereby advancing the latter the distance of one tooth each time the grinding wheel 18 is moved upwardly out of engagement with the saw. As shown, the pawl 41 is pivoted at 42 to the free end of a lever 43 which is pivoted at its upper end to the table frame as at 44. The lever 43 is, in turn, connected intermediate its ends by a pivot 45 to the upper end of a push rod 46 which bears at its lower end on a second cam 47 secured on shaft 27. The rod 46 is made adjustable in length as indicated at 48 so as to vary the stroke of pawl 41 in accordance with the different sizes of teeth on different types and sizes of saws. It will be seen that on each upstroke of rod 46, the pawl 41 will engage a tooth of the saw and turn the latter the distance of a tooth, said pawl freely moving downwardly over the saw teeth on its down stroke as the cam 47 allows rod 46 to lower. The preferred pivotal connection at 42 between pawl 41 and lever 43 is shown in Figure 8, and it includes a block 49 swivelled in the lever 43 at 50 and having the lower end portion of pawl 41 secured therein by a set screw 51 so that the position of the pawl relative to lever 43 may be adjusted.

The motor 16 may be conveniently thrown into and out of operation by the actuation of a manually operable switch 52 mounted in the frame 5 directly beneath the table top 6 and at the front of the table. In a like manner, the motor 28 may be thrown into and out of operation by the actuation of another manually operable switch 53 mounted in and at the front of the frame between the motor 28 and shaft 27.

Means is provided for conducting the grindings from the grinding wheel and saw as the grinding operation proceeds, such means including a vertical conduit 54 extending through the table top 6 and depending to a point adjacent the bottom of the table, said conduit being provided at its upper end with an elbow shaped intake funnel 55 disposed adjacent and at the rear of the lower portion of grinding wheel 18 and the upper portion of the saw. As the grinding wheel 18 is driven in a counter-clockwise direction as viewed in Figure 3, it acts to project the grindings rearwardly into the intake funnel 55 so that such grindings may fall by gravity through the conduit 54 onto the floor or into a suitable receptacle disposed therebeneath.

Figure 6:
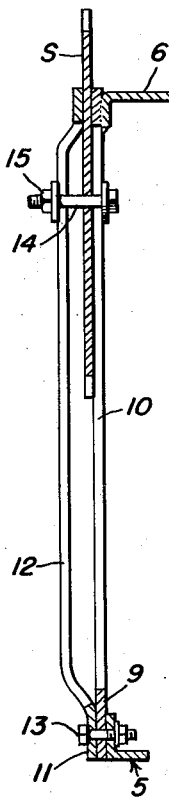
Figure 6 is a central vertical sectional view through the saw and its mounting means, taken on line 6—6 of Figure 1.
Figure 7:
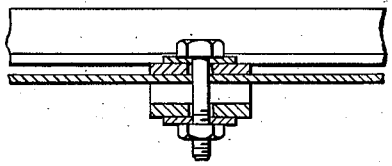
Figure 7 is a fragmentary horizontal section through the saw and its mounting means, taken on line 7—7 of Figure 1.

By removing the nut 15 from pivot bolt 14, the bar 11 may be sprung away from the bar 9, and the pivot bolt 14 may be passed through the central opening of saw S with the latter positioned between the upper end portions of said bars 9 and 11 as shown in Figure 6. The nut 15 is then threaded onto pivot bolt 14 and lightly tightened so that the saw is effectively braced between the upper ends of the bars 9 and 11, although insufficient gripping action is had on the saw to prevent its forcible rotation on the pivot bolt 14 by the action of pawl 41. The motors 16 and 28 are then thrown into operation by actuation of switches 52 and 53. Cam 39 then turns to permit rod 37 to lower so that the grinder will tilt by gravity in the direction wherein grinding wheel 18 moves downwardly into engagement with a tooth of the saw. The grinding wheel remains for a short time in this engaged position and thereby grinds and sharpens the tooth, whereupon the cam 39 moves rod 37 upwardly and tilts the grinder so that its grinding wheel 18 is moved upwardly out of engagement with the sharpened saw tooth. At this time, cam 47 actuates rod 46 so as to move pawl 41 upwardly and, through engagement of said pawl with a tooth of the saw, to turn the latter the distance of one tooth so that the next tooth of the saw is brought into position for being sharpened. Cam 47 then allows rod 46 and pawl 41 to lower so that the pawl is brought into position for the next saw advancing operation of said pawl, and just prior to this time, the cam 39 permits lowering of rod 37 so that the grinder tilts by gravity to allow grinding wheel 18 to engage the succeeding tooth which has been brought into position for being sharpened. The above described cycle of operation is repeated until all teeth of the saw have been sharpened, whereupon the motors 16 and 28 are thrown out of operation and the saw is removed. After the saw has been mounted in place and the position of the grinding wheel and the saw advancing pawl have been properly adjusted, the machine only requires the attention of actuating the switches 52 and 53 to throw the motors 16 and 28 into and out of operation.

From the foregoing, it is believed that the construction, operation and advantages of the present invention will be readily understood and appreciated by those skilled in the art. It will be seen that the machine comprises a very practical organization and arrangement of parts and devices whereby the machine may be readily and cheaply constructed and conveniently controlled or used. In use, the machine has been found very efficient and of such a character as to meet with the requirements for successful commercial use. Modifications and changes in details of construction are contemplated, such as fairly fall within the scope of the invention as claimed.

Having described the invention, what is claimed as new is:

1. A circular saw sharpening machine comprising a table having a horizontal top, means to removably and rotatably mount a circular saw in a vertical position at and parallel with the front of said table so as to project above the top of said table near one side of the latter, a grinder including an electric motor having an elongated rotary power shaft and a grinding wheel secured on the outer end of said power shaft, means rockably mounting the motor of said grinder on the top and at the front of said table so that the grinder is bodily tiltable about a horizontal axis extending from front to rear of the table near the other side of the latter and so that the power shaft thereof projects toward said one side of said table, a motor driven shaft journaled on and below the top of said table and below and to one side of the saw, means operatively connecting said shaft to the grinder mounting means for intermittently rocking the latter grinder to alternately move the grinding wheel downwardly into and upwardly out of engagement with a tooth of the saw, and saw advancing means including a pawl operatively connected to said motor driven shaft and engageable with a tooth of the saw at said one side of the latter for automatically turning and thereby advancing said saw the distance of one tooth each time the grinding wheel is moved out of engagement with a tooth of the saw.

2. A circular saw sharpening machine comprising a table having a horizontal top, a vertical saw clamp mounted at the front and near one side of the table and including a clamping bolt on which the saw may be rotatably mounted, said clamping bolt being vertically adjustable to accommodate in a predetermined position saws of various diameters, a shaft mounted on the top of the table near the other side of the latter and extending from front to rear of the table top, a platform pivoted on said shaft and having an arm projecting toward the saw, a grinder including a motor fixed on said platform and having an elongated shaft journaled in the arm, and a grinding wheel on the free end of said shaft, said platform and motor being disposed at the front of the table, a cam shaft journaled on the table beneath the table top, a pair of cams secured on said cam shaft, a push rod actuated by one of said cams and connected to said arm for intermittently rocking the grinder to move the grinding wheel upwardly out of engagement with a tooth of the saw and to allow downward movement of the grinding wheel into engagement with a tooth of the saw, a pawl engageable with a tooth of the saw at one side of the latter and vertically movable relative to the table, and means including a push rod actuated by the other cam and operatively connected to the pawl for actuating the latter so as to turn the saw the distance of a tooth each time the grinding wheel is moved out of engagement with the saw.

3. The construction defined in claim 2, in combination with a motor mounted in the lower portion of the table, and a speed reduction driving connection between said motor and said cam shaft, said speed reduction connection comprising a countershaft mounted on the table beneath the top of the latter and above the cam shaft, a belt gearing between the motor and said countershaft, and a belt gearing between the countershaft and said cam shaft.

4. The construction defined in claim 1, in combination with means to conduct grindings from the grinding wheel and saw including a vertical conduit extending through the top of the table and depending to a point adjacent the bottom of the latter, and an elbow-shaped intake hood on the upper end of said conduit located at the rear side of the grinding wheel and saw.

RUTH V. HARRELL,
*Administratrix of the Estate of William T. Harrell, Deceased.*

REFERENCES CITED

The following references are of record in the file of this patent:

UNITED STATES PATENTS

| Number | Name | Date |
| --- | --- | --- |
| 359,133 | Covel | Mar. 8, 1887 |
| 458,205 | Wheeler | Aug. 25, 1891 |
| 1,501,564 | Lifflander | July 15, 1924 |
| 1,530,378 | Lanfranchi | Mar. 17, 1925 |
| 1,780,886 | Pribnow et al. | Nov. 4, 1930 |
| 1,832,878 | Porter | Nov. 24, 1931 |
| 2,146,686 | Raxll | Feb. 7, 1939 |
| 2,329,879 | Christy et al. | Sept. 21, 1943 |
| 2,334,136 | Underwood | Nov. 9, 1943 |